United States Patent
Blanchard et al.

(10) Patent No.: US 8,407,754 B2
(45) Date of Patent: Mar. 26, 2013

(54) EFFICIENT MOBILE RECEIVER AUTOPROGRAMMING

(75) Inventors: Robert Blanchard, Escondido, CA (US); Peter Shintani, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 918 days.

(21) Appl. No.: 12/212,185

(22) Filed: Sep. 17, 2008

(65) Prior Publication Data

US 2010/0071019 A1 Mar. 18, 2010

(51) Int. Cl.
*H04N 7/18* (2006.01)
*H04N 7/173* (2011.01)

(52) U.S. Cl. .................................. 725/131; 725/85
(58) Field of Classification Search .............. 725/131, 725/85
See application file for complete search history.

(56) References Cited

U.S. PATENT DOCUMENTS

| | | | |
|---|---|---|---|
| 5,393,713 A * | 2/1995 | Schwob | 455/158.5 |
| 5,809,427 A * | 9/1998 | Perreault et al. | 455/513 |
| 6,137,546 A * | 10/2000 | Shintani et al. | 348/731 |
| 7,280,810 B2 * | 10/2007 | Feher | 455/137 |
| 7,375,771 B2 * | 5/2008 | Naoi et al. | 348/732 |
| 7,826,837 B1 * | 11/2010 | Sylvester | 455/423 |
| 2002/0181580 A1 * | 12/2002 | Van Der Schaar | 375/240.01 |
| 2003/0013425 A1 * | 1/2003 | Nee | 455/186.1 |
| 2005/0020223 A1 * | 1/2005 | Ellis et al. | 455/186.1 |
| 2005/0171653 A1 * | 8/2005 | Taylor | 701/13 |
| 2005/0181810 A1 * | 8/2005 | Camp et al. | 455/456.6 |
| 2006/0143662 A1 * | 6/2006 | Easterling et al. | 725/76 |
| 2007/0142055 A1 * | 6/2007 | Toivanen et al. | 455/450 |

FOREIGN PATENT DOCUMENTS

| | | |
|---|---|---|
| WO | WO 2006011967 | 2/2006 |
| WO | WO 2007001265 | 1/2007 |

* cited by examiner

*Primary Examiner* — Pankaj Kumar
*Assistant Examiner* — Franklin Andramuno
(74) *Attorney, Agent, or Firm* — John L. Rogitz

(57) ABSTRACT

A mobile receiver is programmed with available channels by initially searching for all potentially available channels and autoprogramming the receiver with channels that are detected by the receiver. Subsequently, only potentially available channels that have not been programmed into the receiver are searched for to reduce autoprogramming time when, e.g., the mobile receiver is carried to a higher elevation.

14 Claims, 1 Drawing Sheet

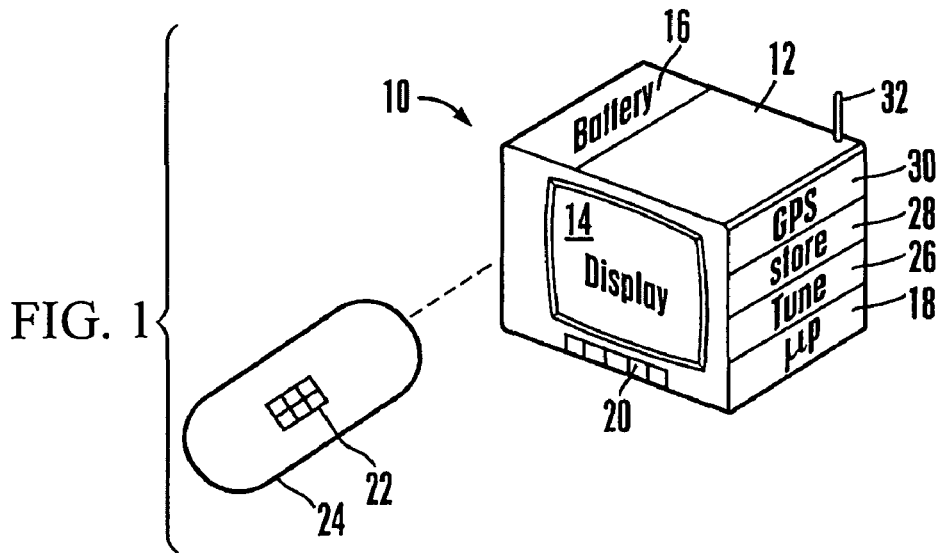
FIG. 1
FIG. 2
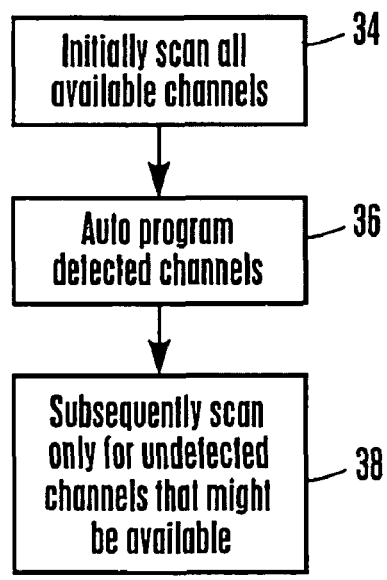
FIG. 3
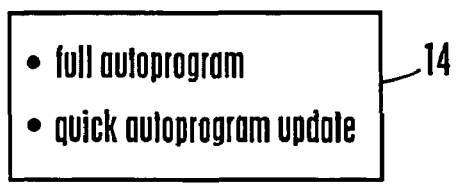

EFFICIENT MOBILE RECEIVER AUTOPROGRAMMING

FIELD OF THE INVENTION

The present invention relates generally to automatically programming channels into mobile receivers such as mobile televisions and radios.

BACKGROUND OF THE INVENTION

When a television is initially installed in a user's home after purchase, the receiver of the TV automatically searches for channels that are available in the area and records information pertaining to available channels in memory using a data structure known as a "channel map". The channel map includes information for each available channel, such as channel frequency. Without a channel map the receiver otherwise would tune to the next higher channel in response to a "channel up" command regardless of whether a signal is present. This also would be the case for channel changes for decrementing the channel number. The search and record function is known as "autoprogramming" because it automatically programs the TV with information pertaining to available channels.

As understood herein, with the advent of digital televisions and hundreds of satellite channels, digital ones of which might in fact carry several sub-channels, the autoprogramming function discussed above can consume much time. This is not only because of the increased number of channels but also because digital channels are more complicated to map, requiring not just a frequency map but also various decoding information.

As also understood herein, the location of a mobile TV receiver frequently can change and with it the available channels, precipitating another autoprogramming cycle even if the location of the receiver and thus the identity of available channels haven't changed much. Indeed, as recognized herein due to variable reception conditions such as elevation, shielding by buildings or terrestrial objects, etc, a mobile receiver may not be able to detect all the potentially available channels in a given location at a given time, although such channels might become immediately available when the receiver is moved a relatively short distance.

SUMMARY OF THE INVENTION

To avoid a complete cycle of autoprogramming a receiver when the receiver has been moved a comparatively short distance that permits the receiver to receive signals from many if not most of the channels that are already programmed into the receiver, the receiver searches only for channels that have not yet been programmed into it.

Accordingly, a method for programming a mobile receiver with available channels includes initially searching for all potentially available channels, and programming the receiver with channels that are detected by the receiver. The method also includes subsequently searching only for potentially available channels that have not already been programmed into the receiver.

In some implementations the partial search is executed automatically in response to a determination that the receiver has moved, e.g., in altitude and/or beyond a threshold. The potentially available channels may be indicated by a potentially available channel map, and channels that are detected during initial full autoprogramming can be listed on an actually available channel map. Then, channels detected during subsequent partial scans may be added to the actually available channel map. The actually available channel map can then be invoked in response to, e.g., a channel command. If desired, peer to peer information may be used to generate the actually available channel map.

In another aspect, a mobile receiver has a channel tuner, a processor communicating with the tuner, and a computer readable medium accessible to the processor. The medium can include instructions to cause the processor to control the tuner to execute a scan of all frequencies in a group of frequencies associated with potentially available channels. Information related to all channels detected during the scan is added to an actually available channel data structure. Subsequently, a scan is executed only of frequencies in the group of frequencies that are not associated with channels in the actually available channel data structure.

In another aspect, a system includes means for tuning to each of plural potentially available channels, and means for adding potentially available channels that are detected to an actually available channel listing. Means are provided for, subsequent to adding the potentially available channels that are detected to the actually available channel listing, scanning only potentially available channels not already on the actually available channel listing.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective of an example implementation of the receiver, with some components shown schematically;

FIG. 2 is a flow chart of example logic that may be used in accordance with present principles; and FIG. 3 is an example graphical user interface (GUI) that can be used to allow a user to initiate quick autoprogramming.

DETAILED DESCRIPTION OF THE PREFERRED EMBODIMENT

Referring initially to FIG. 1, a mobile receiver 10 includes a portable, typically hand-held lightweight hollow housing 12 bearing a video display 14 such as but not limited to a flat panel matrix display, a microdisplay device, a laser or LED-based microprojection device, etc. The display 14 may be standard definition video, high definition video, or other type of video display. Thus, while the receiver 10 in FIG. 1 is a TV receiver it is to be understood that the receiver alternatively may be, e.g., an AM/FM radio receiver, etc. that is configured to receive plural channels of typically broadcast programming.

Being a mobile receiver 10, the housing 12 may also bear one or more DC batteries 16. In some embodiments the housing 12 can further include an AC power receptacle to receive AC power from the electrical grid.

As shown in FIG. 1, the receiver 10 includes a processor 18 that controls the display 14 in response to user commands such as channel up/down commands, volume up/down commands, etc. input by means of control keys 20 on the housing 12 and/or by means of keys 22 on a wireless remote control 24 communicating with the processor 18. The example receiver 10 of FIG. 1 also includes a TV tuner 26 communicating with the processor 18 for outputting signals from a channel on a tuned-to frequency for presentation on the display 14.

The processor 18 also accesses a computer readable medium 28 such as disk-based storage, solid state storage, etc. Computer instructions embodying the logic of FIG. 2 may be contained on the medium 28, as can data structures such as one or more channel maps or other appropriate data structures (e.g., tables) each of which can be correlated to respective geographic locations if desired.

In example embodiments the processor 18 can also receive position information from a position receiver 30 such as but not limited to a geographic position satellite (GPS) receiver. In addition or alternatively as user can input a geographic location using the control keys 20, 22. An antenna 32 may also be provided on the housing for receiving broadcast signals, which may be sent to the processor 18.

Now referring to FIG. 2, an initial autoprogramming is executed at block 34 in which all potentially available frequencies are scanned for to detect available channels. The initial autoprogramming may be accomplished automatically upon first energization in a geographic region as indicated by, e.g., the signal from the position receiver 30 or by user input, and/or it may be done in response to a user command using, e.g., the GUI of FIG. 3 discussed further below.

In some embodiments, to execute block 34 the processor 18 accesses a pre-stored potentially available channel map in the medium 28, in some implementations using geographic location as entering argument. The channel map defines all of the channels that are potentially available, and all channels on the potentially available channel map are scanned at block 34.

In other implementations, upon initial power on the receiver 10 can receive a transmitter location data base which provides the potentially available channel map listing all potentially available channels for which to scan.

In still other embodiments no initial channel map may be provided, in which case the processor 18 simply scans each frequency on which a channel might be carried in the relevant band (e.g., the TV channel frequency band) from, e.g., lowest frequency to highest. In this case, each frequency on which a channel might be carried in the relevant band in effect defines the potentially available channel map. Scanning the band enables the processor 18 to determine if a channel signal is found at each frequency.

Based on the channels that are detected as being actually available during the scan, the processor 18 constructs an "actually available channel" map. At block 36 the channels on the actually available channel map are autoprogrammed into the receiver 10. Autoprogramming may include, e.g., programming information for each channel found to be available at block 34 including, e.g., channel frequency, decoding information for digital channels, etc.

In the event that the receiver 10 is moved, the logic of block 38 can be executed. At block 38, only frequencies associated with channels that were not detected as being available at block 34 are scanned to determine if channel signals can detected on those frequencies such that autoprogramming time subsequent to initial autoprogramming advantageously can be minimized. In one example implementation the processor 34 accesses the "actually available channel" map and compares it to the potentially available channel map and scans only for channels of the potentially available channel map that are not also listed on the actually available channel map.

For example, if the receiver 10 is moved from a relatively low height to a relatively high height, e.g., to a high floor in a building, additional channels may be detected that were undetected at block 34 during initial autoprogramming at the lower height. Under these circumstances the newly available channels are quickly autoprogrammed because only frequencies that were not detected to carry channel signals at block 34 are scanned.

To this end, in some example embodiments signals from the position receiver 30 can be used to provide elevation information. Or, the user may manually enter elevation information. In either case, the logic at block 38 may be automatically executed upon receipt of elevation data that differs from prior (or default) elevation information by more than a threshold amount.

Yet again, as shown in FIG. 3 a GUI can be presented on the display 14 in response to selection of "autoprogram" from a higher level menu. The GUI may include a "full autoprogram" selection, which if selected by the user by means of, e.g., the control keys 20/22 causes the logic of block 34 to be executed. The GUI may also include a "quick autoprogram update" selection which, if selected, causes the logic of Block 38 to be executed.

Still further, the logic of block 38 may be executed automatically when signals from, e.g., the position receiver 30 indicate a change in location greater than a local area threshold, indicating that the receiver substantially remains in the area in which the initial autoprogram was executed but has moved sufficiently to open the possibility that previously unavailable channels might have become available. Along these same lines the full autoprogram logic of block 34 may be executed automatically when signals from, e.g., the position receiver 30 indicate a change in location greater than a wide threshold, indicating that the receiver 10 has moved substantially completely out of the area in which the initial autoprogram was executed.

In any case, in non-limiting embodiments based upon a TV transmitter's height above average terrain (HAAT) data that can be stored in, e.g., the medium 28, the receiver 10 can access a transmitter database in, e.g. the medium 28 to identify neighboring areas for additional potential channels for which to scan, in addition to or in lieu of the channel map comparison described above. Additionally or alternatively, a reception prediction algorithm such as the Longley-Rice algorithm can be executed by the processor 18 to determine which channels are potentially available given the height of the receiver 10.

In addition to or in lieu of using GPS as a position receiver, multiple means may be used for determining the location of the receiver. For example, reception of stations of known geographic location can be used as a determination of the location of the receiver 10. Yet again, a last known location of the receiver 10 may be used to predict the current location of the receiver 10, e.g., based on historical scan patterns the processor 18 may always execute the partial scan of block 38 at a certain location, anticipating movement to another location. Or, the processor can use time of day to make assumptions based upon prior usage in order to predict the location. Alternatively, an absolute or relative pressure sensor such as a Silicon-based sensor may be used in the receiver 10 for detecting elevation changes. Still further, the receiver 10 may incorporate an equalizer/ghost canceller filter and if it does, the processor 18 may monitor for changes in the associated filter coefficients greater than a threshold, and/or equalizer tap energy, indicating that a location change or other change potentially making additional channels available has occurred and thus triggering the partial scan logic.

If desired, a group of users using similar receivers 10 can use peer to peer communication to alert each other of the content of a local actually available channel map. In such an embodiment each receiver 10 would include a transmitter such as a WiFi transmitter or wireless telephony transmitter.

As contemplated herein, in the event that the receiver 10 is moved from an area of good reception to an area of poor reception, the entire autoprogram logic of block 34 may be re-executed, or, if an "actually available channel" map exists for the area of poor reception, that map can be retained in memory and then invoked for channel surfing purposes in lieu of the "actually available channel." map for the area of good reception when the position receiver 30 indicates that the mobile receiver 10 is back in the area of poor reception.

While the particular EFFICIENT MOBILE RECEIVER AUTOPROGRAMMING is herein shown and described in detail, it is to be understood that the subject matter which is encompassed by the present invention is limited only by the claims.

What is claimed is:

1. Method for programming a mobile receiver with available channels, comprising:
   initially searching for all potentially available channels;
   programming the receiver with channels that are detected by the receiver; and
   subsequently and automatically searching only for potentially available channels that have not been programmed into the receiver during the programming act and that were searched for during the act of initially searching for all potentially available channels but were not detected during the act of initially searching for all potentially available channels, wherein the act of subsequently searching is executed automatically in response to a determination that the receiver has moved in altitude.

2. The method of claim 1, wherein the act of subsequently searching is executed automatically in response to a determination that the receiver has moved translationally in geographic position.

3. The method of claim 1, wherein the act of subsequently searching is executed automatically in response to a determination that the receiver has moved beyond a threshold.

4. The method of claim 1, wherein the potentially available channels are indicated by at least one potentially available channel map.

5. The method of claim 1, wherein channels that are detected during the programming act are listed on an actually available channel map, and channels detected during the act of subsequently searching are added to the actually available channel map, the actually available channel map being invoked at least in response to a channel command.

6. The method of claim 1, wherein peer to peer information is used to generate the actually available channel map.

7. Mobile receiver comprising:
   a channel tuner;
   a processor communicating with the tuner;
   a computer readable medium accessible to the processor and including instructions to cause the processor to:
      control the tuner to execute a scan of all frequencies in a group of frequencies associated with potentially available channels;
      add information related to all channels detected during the scan to an actually available channel data structure; and
      subsequently execute a scan only of frequencies in the group of frequencies that are not associated with channels in the actually available channel data structure, wherein the processor automatically executes a scan only of frequencies in the group of frequencies that are not associated with channels in the actually available channel data structure in response to a determination that the receiver has moved beyond a threshold.

8. The mobile receiver of claim 7, wherein the processor automatically executes a scan only of frequencies in the group of frequencies that are not associated with channels in the actually available channel data structure in response to a determination that the receiver has moved.

9. The mobile receiver of claim 7, wherein the processor automatically executes a scan only of frequencies in the group of frequencies that are not associated with channels in the actually available channel data structure in response to a determination that the receiver has moved in altitude.

10. The mobile receiver of claim 7, wherein the potentially available channels are indicated by at least one potentially available channel map.

11. The mobile receiver of claim 7, wherein the actually available channel data structure is invoked at least in response to a channel command.

12. The mobile receiver of claim 7, wherein peer to peer information is used to generate the actually available channel data structure.

13. The mobile receiver of claim 7, wherein the channel tuner is a TV tuner.

14. The mobile receiver of claim 7, wherein the channel tuner is a radio tuner.

* * * * *